(No Model.)
J. GIBSON & J. CAMERON.
CHEESE CUTTER.
No. 471,716. Patented Mar. 29, 1892.
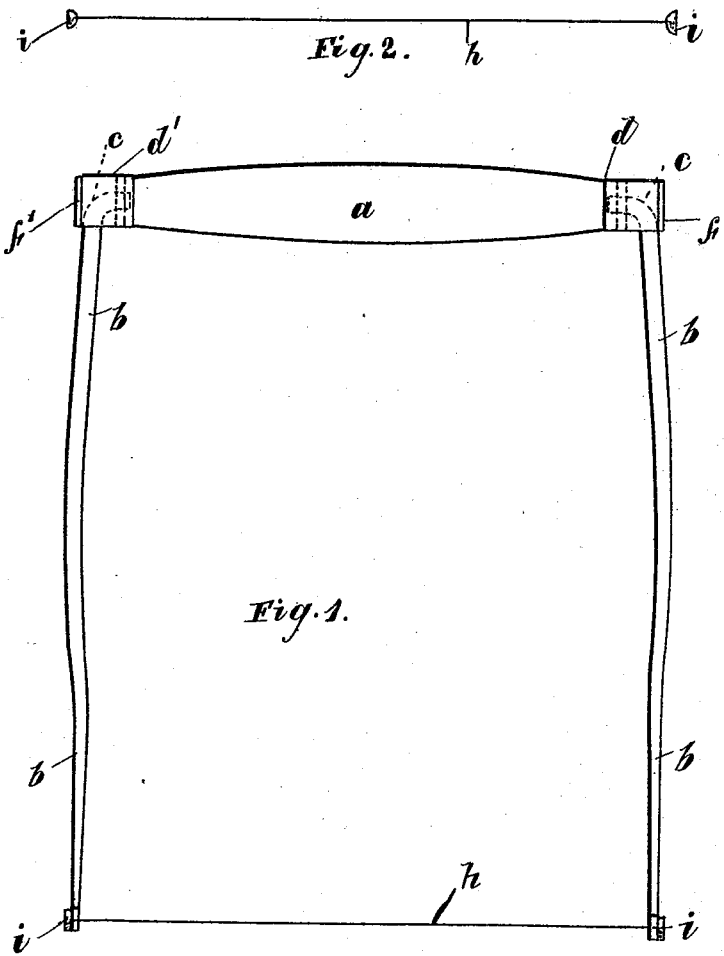

UNITED STATES PATENT OFFICE.

JOHN GIBSON AND JOHN CAMERON, OF GLASGOW, SCOTLAND.

CHEESE-CUTTER.

SPECIFICATION forming part of Letters Patent No. 471,716, dated March 29, 1892.

Application filed November 17, 1891. Serial No. 412,173. (No model.) Patented in England February 6, 1891, No. 2,175.

*To all whom it may concern:*

Be it known that we, JOHN GIBSON and JOHN CAMERON, subjects of the Queen of Great Britain, and residents of the city of Glasgow, Scotland, have invented certain new and useful Improvements in Cutters for Cutting Cheese and the Like, (for which we have received British patent dated February 6, 1891, No. 2,175,) of which the following is a specification.

This invention relates to an improved cutter for cutting cheese and the like.

In order that our said invention may be properly understood, we have hereunto appended an explanatory sheet of drawings, whereon—

Figure 1 is a plan view of the cutter. Fig. 2 is a view of the cutting-wire. Fig. 3 is an enlarged side view of the lower end of one of the arms of the cutter.

The cutter consists of a wooden handle $a$, to which is secured two, preferably steel, arms $b$. The arms $b$ are bent at $c$ (shown in dotted lines) and inserted into the ends of the handle $a$.

$d\ d'$ are metal ferrules fitted on the ends of the handle, and pins are passed through these ferrules and the ends of the handle, and also through the bent ends $c$ of the arms, so as to retain the said arms firmly and securely in place.

$f\ f'$ are caps soldered or brazed to the outer ends of the ferrules $d\ d'$. The lower ends of the arms $b$ are hooked or bent, as shown at $g$, Fig. 3.

$h$ is a wire, having on it at each end a knob or head $i$, of solder or the like. The wire $h$ is caught and held by the hook $g$ on each arm, and as the knobs $i$ are larger than the hooks $g$ they prevent the wire from coming out of its place when under tension. The arms $b$ have a sufficient spring in them to always keep the wire $h$ stretched taut.

In using the cutter it is grasped by the handle $a$ and held sidewise—that is, with the arms vertically above one another. It is then pulled toward the person in such manner that the wire $h$ will cut through the cheese or the like. In working on a counter a groove may be cut in the counter to serve as a guide for the lower arm to slide in.

If one of the wires $h$ should by the excessive tension break at any time, it can be easily replaced by another wire.

Having now fully described our invention, what we claim, and desire to secure by Letters Patent, is—

1. A cutter for cheese and the like, consisting of a handle with projecting spring-arms, hooks at their outer ends, with the ends of the hooks terminating in the direction of the handle and at a distance from the body of the arms to leave a space between the ends of the hooks and body of the arms for the insertion of a cutting-wire, the base of the hooks affording a bearing for the wire to prevent displacement of the wire in drawing the cutter in the direction of the handle through the substance to be cut, a cutting-wire extending from one arm to the other and lying on the hooks of the arms, and knobs on the ends of the wire, bearing against the hooked ends of the arms and of larger diameter than the eye of the hooks, whereby the wire is prevented from being forced out of its bearings when under tension, substantially as and for the purposes set forth.

2. In a cutter for cheese and the like, the combination of the spring-arms having a cutting-wire connecting them at one end and their other ends bent inwardly, a handle connecting the inwardly-bent ends, ferrules encircling the ends of the handle and the inwardly-bent ends of the spring-arms, and pins passed through the ferrules, handle, and inwardly-bent ends of the arms to hold the same together, substantially as and for the purposes described.

Signed at Glasgow this 28th day of October, 1891.

JOHN GIBSON.
JOHN CAMERON.

In presence of—
HUGH D. FITZPATRICK,
WILLIAM GALL.